United States Patent Office 3,546,202
Patented Dec. 8, 1970

---

3,546,202
2,7-BISPHENYLAZOCHROMOTROPIC ACID DI-AMIDE DERIVATIVES AND METHOD OF PREPARATION THEREOF
Břetislav Buděšínský and Karel Haas, Prague, Czechoslovakia, assignors to Československa Akademie Ved, Prague, Czechoslovakia
No Drawing. Filed July 6, 1966, Ser. No. 563,047
Claims priority, application Czechoslovakia, July 8, 1965, 4,367/65
Int. Cl. C09b 33/04, 45/12
U.S. Cl. 260—185
15 Claims

ABSTRACT OF THE DISCLOSURE 2,7-bisphenylazo derivatives of chromotropic acid diamides of the general formula:

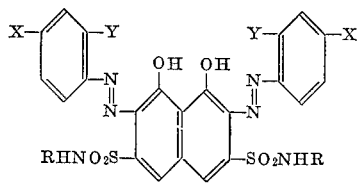

wherein R is selected from the group consisting of hydrogen, $(CH_2)_{17}CH_3$ and $C_6H_5$, X is selected from the group consisting of hydrogen, chlorine, $CH_3$ and $NO_2$, and Y is selected from the group consisting of $AsO_3H_2$, $PO_3H_2$, $SO_3H$ and OH, are produced by treating portionwise a cold solution in water and an organic base and containing a suspension of excess calcium hydroxide or calcium oxide, of a substituted chromotropic acid diamide of the formula:

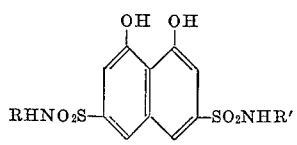

wherein R and R' each, respectively, has the same meaning as R above, with a solution of a diazotized primary amine of the general formula $C_6H_3XYNH_2$, wherein X and Y respectively, have the same meanings as above. The compounds are useful particularly as extractive and spectrophotometric reagents for the determination of various ions, particularly of heavy metal ions.

---

The present invention relates to metallochromic and extractive chromotropic acid diamides and a method of making the same.

The 2-monophenylazo and 2,7-bisphenylazo derivatives of chromotropic acid are known as excellent metallochromic reagents applicable mainly for a highly sensitive spectrophotometric determination of various metal ions, e.g. $UO_2^{2+}$, $U^{4+}$, $Th^{4+}$, $Zr^{4+}$, $Hf^{4+}$, $Y^{3+}$, trivalent lanthanide cations, $Mg^{2+}$, $Ca^{2+}$, $Sr^{2+}$, and $Ba^{2+}$, as well as, in some cases for a visual indication of complexometric titrations, cf. S.B. Savvin: Uspekhi Khimmii 32, 195 (1964).

A certain draw-back of the aforementioned derivatives (especially when used in spectrophotometry) consists in the fact that they are applicable merely in an aqueous solution or in a homogeneous aqueous-organic solvent solution whereas the use as extractive agents in a non-aqueous phase, particularly in a relatively strongly acidic medium, e.g. 0.1–1 M acid, is almost impossible in view of the presence of hydrophilic sulfonic acid residues in the molecule of chromotropic acid. Some higher amines containing at least 10–12 carbon atoms have been used to convert the sulfonic acid residues into salts which form with $UO_2^{2+}$ a complex capable of extraction, but this method is not of a general character since the extraction does not proceed satisfactorily with trivalent or tetravalent cations, cf. V. I. Kuznecov, S. B. Savvin: Doklady akad. nauk SSSR, 140, 125 (1961).

It is therefor an object of the present invention to overcome the above discussed difficulties.

It is a further object of the present invention to provide metallochromic and extractive chromotropic acid diamides and a relatively simple method of producing the same, which diamides are particularly suitable as extractive and spectrophotometric reagents for the determination of elements such os yttrium, the lanthanides, uranium, thorium, zirconium, hafnium, barium, strontium and copper.

Other objects and advantages of the present invention will become apparent from a further reading of the description and of the appended claims.

With the above and other objects in view, the present invention contemplates a method for producing 2,7-bisphenylazo derivatives of chromotropic acid di-amides of the general formula:

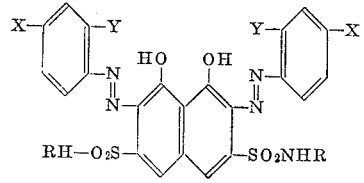

wherein R is selected from the group consisting of hydrogen, $(CH_2)_{17}CH_3$ and $C_6H_5$, X is selected from the group consisting of hydrogen, chlorine, $CH_3$ and $NO_2$, and Y is selected from the group consisting of $AsO_3H_2$, $PO_3H_2$, $SO_3H$ and OH, comprising the steps of treating portionwise a cold solution in water and an organic base and containing a suspension of excess calcium hydroxide or calcium oxide, of a substituted chromotropic acid diamide of the formula:

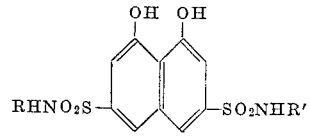

wherein R and R' each, respectively, has the same meaning as R above, with a solution of a diazotized primary amine of the general formula $C_6H_3XYNH_2$, wherein X and Y, respectively, have the same meanings as above.

The present invention also includes as a new composition of matter, 2,7-disphenylazo derivatives of chromotropic acid di-amides of the general formula:

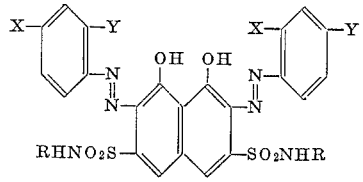

wherein R is selected from the group consisting of hydrogen, $(CH_2)_{17}CH_3$ and $C_6H_5$, X is selected from the group consisting of hydrogen, chlorine, $CH_3$ and $NO_2$, and Y is selected from the group consisting of $AsO_3H_2$, $PO_3H_2$, $SO_3H$ and OH.

According to the process of the present invention, the hydrophilic nature of sulfonic acids residues can be removed by conversion into sulfonamides which are highly soluble in many organic solvents. On the whole, coupling of diazonium salts with chromotropic acid amides proceeds almost as readily as with chromotropic acid alone.

The resulting 2,7-bisphenylazo derivatiives of chromotropic acid diamides of the general Formula I:

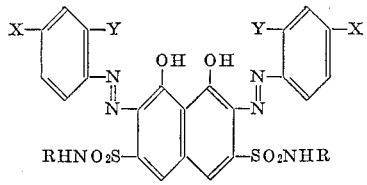

wherein R represents a hydrogen atom, a —(CH$_2$)$_{17}$CH$_3$ or a —C$_6$H$_5$ group, X represents a hydrogen atom, a chloro atom, or a —CH$_3$ or a —NO$_2$ group, and Y is a —AsO$_3$H$_2$, —SO$_3$H, or a —OH group, represent excellent extractive and spectrophotometric reagents for the determination of yttrium, lanthanides, uranium, thorium, zirconium, hafnium, barium, strontium and copper.

Diazotization of the corresponding primary amines of the general formula C$_6$H$_3$XYNH$_2$, wherein X and Y represent the same atoms or groups as in the general Formula I, is performed in the usual manner.

The solutions of the resulting diazonium salts are cooled to between —5° C. and 0° C. and then introduced under stirring and cooling into a solution of a substituted chromotropic acid amide of the general Formula II:

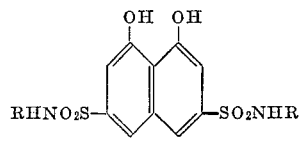

wherein R and R' each, respectively, has the same meaning as R in Formula I.

The chromotropic acid amide is dissolved in a mixture of water and of an organic base (in a ratio from 5:1 to 1:1 by volume) which mixture contains an excess of a suspension of calcium hydroxide or calcium oxide, and is precooled to a temperature of between —3° C. and 0° C.

It is advisable to use an about twofold to fivefold excess of the diazonium salt with respect to the diamide, since the formation of the bisazo dye proceeds with difficulty, especially when bulky substituents R, X, and Y are present. To prevent a rapid decomposition of the exces diazonium salt, the aforementioned temperature range is necessary. At temperatures below —3° C., an undesirable solidification of the reaction mixture sets in. Because of the relatively low stability of the diamides in strongly alkaline solutions, it is necessary to acidify immediately after the accomplishment of the alkaline reaction.

The resulting 2,7-bisphenylazo derivatives of chromotropic acid diamides are generally very insoluble in all solvents, so that the unreacted original diamide, the 2-monophenylazo dye, the liberated chromotropic acid, calcium chloride, or the decomposition products arising by diazotization of aniline ortho-substituted derivatives can be separated from the 2,7-bisphenylazo derivative by simple dissolution.

The system of abbreviations used for naming the products obtained by the present process of invention is analogous to that of compounds possessing free sulfonic acid residues; the symbol DAL represents a dianilide, DODA dioctadecyldiamide, and DA a diamide.

The following examples are given as illustrative only, without, however, limiting the invention to the specific details of the examples.

EXAMPLE 1.—DIARSONOAZO DAL

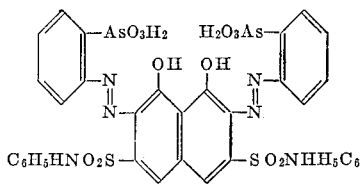

A suspension of finely ground aniline-o-arsonic acid (8.7 g.; 0.04 mole) in a mixture of water (30 ml.) and concentrated hydrochloric acid (5 ml.) is cooled to —5° C. and diazotized under stirring with a solution of sodium nitrite (2.8 g.) in water (10 ml.) at a temperature not exceeding —1° C. The resulting diazonium salt solution is stored in a refrigerator for 10 minutes and then added dropwise into a stirred mixture prepared from a solution of chromotropic acid dianilide (4.7 g.; 0.01 mole) in pyridine (20 ml.) and water (200 ml.) to which finely ground calcium oxide (6 g.; free of the carbonate) had been added and which had been precooled to —2° C. to —3° C. (at lower temperatures the dianilide separates). The addition is performed at the same temperature, i.e., at —2° C. to —3° C. and the reaction mixture soon acquires a cardinal-red color. When the diazonium salt is added too rapidly or when the stirring and cooling is not efficient, considerable frothing may occur. The course of the reaction may be checked as follows:

One drop of the reaction mixture is added to 5 ml. of 0.5 M hydrochloric acid and the mixture is shaken with 5 ml. of n-butylalcohol; the organic layer must acquire a purple coloration which must rapidly change into bluish-green by the addition of one drop of 0.01 M uranyl nitrate. When the addition of the diazonium salt is completed, the reaction mixture is acidified under stirring at —3° C. to 0° C. with 50 ml. of concentrated hydrochloric acid, the precipitate is immediately collected with suction, washed with 20 ml,. of cold water and dried in a desiccator over phosphorus pentoxide for a period of 24 hours. The suspension of the precipitate in 200 ml. of 96–99% ethanol (or acetone) is then refluxed for 10 minutes and allowed to cool a little. The precipitate is then rapidly filtered off with suction, washed with 20 ml. of the same solvent and air-dried for the period of 1–3 days. Yield, 4 g. (43%) of the product, molecular weight: 926.6.

EXAMPLE 2.—DICHLORODIPHOSPHONAZO DAL

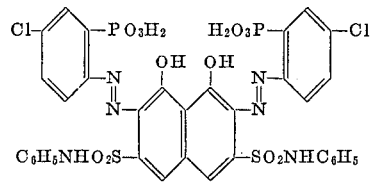

A stirred suspension of finely-ground 2-amino-5-chlorophosphoric acid (6.2 g.; 0.03 mole), water (20 ml.) and concentrated hydrochloric acid (5 ml.) is cooled to —5° C. and diazotized with a solution of sodium nitrite (2.1 g.) in water (10 ml.) at a temperature not exceeding —1° C. The reaction mixture is then worked up in analogy to Example 1 with the exception that the acidification of the solution of the dyestuff in pyridine is performed by a dropwise addition into concentrated hydrochloric acid (300 ml. instead of 50 ml.) under temperature conditions as specified in Example 1. Yield, 3.5 g. (39%) of the product, molecular weight: 907.6.

EXAMPLE 3.—DIMETHYLDISULFONAZO DAL

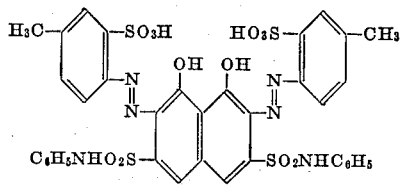

A cold solution of p-toluidine-m-sulfonic acid (5.6 g.; 0.03 mole) in 1 M sodium hydroxide (35 ml.) is combined with a solution of sodium nitrite (2.1 g.) in water (10 ml). The mixture is immediately added dropwise at a temperature not exceeding −1° C. into dilute (1:1 by volume) aqueous hydrochloric acid (15 ml.) which had been precooled to −3° C. The resulting diazonium salt solution is worked up in analogy to Example 1. The control test, however, is performed by shaking the n-butyl-alcoholic solution of the dyestuff with 5 ml. of 0.01 M barium chloride: the original purple coloration must change into violet. Yield, 3.5 g. (40%) of the product, molecular weight: 866.9.

EXAMPLE 4.—DINITRODIHYDROXYAZO DAL

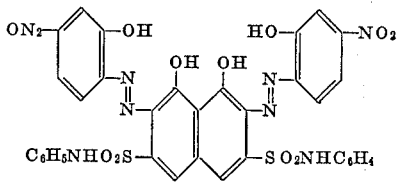

A suspension of finely ground o-hydroxy-p-nitroaniline (6.1 g.; 0.04 mole), concentrated hydrochloric acid (20 ml.), and water (20 ml.) was cooled to −5° C. and worked up as in Example 1. Yield, 2.5 g. (31%) of the product, molecular weight: 800.8.

EXAMPLE 5.—DIARSONOAZO DODA

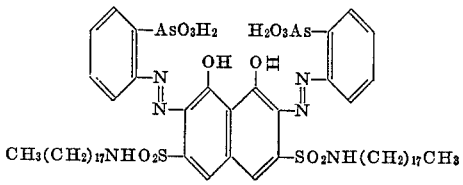

A stirred suspension of finely ground aniline-o-arsonic acid (8.7 g.; 0.04 mole), concentrated hydrochloric acid (5 ml.) and water (30 ml.) was cooled to −5° C. and diazotized with a solution of sodium nitrite (2.8 g.) in water (10 ml.) at a temperature not exceeding −1° C. The second component is represented by a solution of chromotropic acid dioctadecyldiamide (8.2 g.; 0.01 mole) in pyridine (50 ml.) and water (200 ml.). The further procedure is analogous to that described in Example 1 with the difference that the acidification is performed with 100 ml. of concentrated hydrochloric acid. Yield, 5.1 g. (40%) of the product, molecular weight: 1279.4.

EXAMPLE 6.—DIARSONOAZO DA

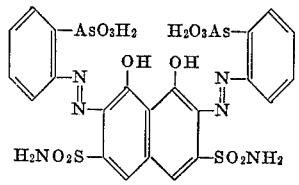

Aniline-o-arsonic acid (8.7 g.; 0.04 mole) is worked up in analogy to Example 1 with the difference that chromotropic acid diamide (3.2 g.; 0.01 mole) is used instead of the dianilide. Yield, 3.1 g. (40%) of the product, molecular weight: 774.4.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention.

What is claimed as new and desired to be secured by Letters Patent is:

1. As a composition of matter 2,7-bisphenylazo derivatives of chromotropic acid di-amides of the general formula:

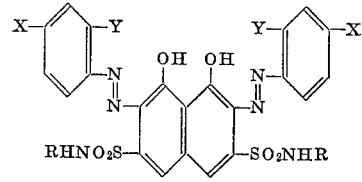

wherein R is selected from the group consisting of hydrogen, $(CH_2)_{17}CH_3$ and $C_6H_5$, X is selected from the group consisting of hydrogen, chlorine, $CH_3$ and $NO_2$, and Y is selected from the group consisting of $AsO_3H_2$, $PO_3H_2$, $SO_3H$ and OH.

2. As a composition of matter as defined in claim 1, the compound dianilide of 2,7-bis(o-arsonophenylazo) chromotropic acid.

3. As a composition of matter as defined in claim 1, the compound dianilide of 2,7-bis(p-chloro-o-phosphonophenylazo) chromotropic acid.

4. As a composition of matter as defined in claim 1, the compound dianilide of 2,7-bis(p-methyl-o-sulfophenylazo) chromotropic acid.

5. As a composition of matter as defined in claim 1, the compound dianilide of 2,7-bis(o-hydroxy-p-nitrophenylazo) chromotropic acid.

6. As a composition of matter as defined in claim 1, the compound dioctadecylamide of 2,7-bis(o-arsonophenylazo) chromotropic acid.

7. As a composition of matter as defined in claim 1, the compound diamide of 2,7-bis(o-arsonophenylazo) chromotropic acid.

8. The method of producing the compounds defined in claim 1 comprising mixing and permitting to react (A) a chromotropic acid diamide of the formula

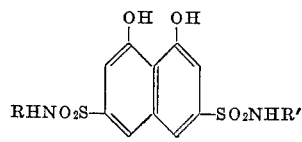

wherein R is $(CH_2)_{17}CH_3$ or $C_6H_5$ with a mixture of water and an organic base at a ratio from 5:1 to 1:1 by volume, which water-base mixture contains an excess of calcium hydroxide or calcium oxide in suspension, with (B) a solution of a diazotized primary amine of the formula $C_6H_3XYNH_2$, wherein X is hydrogen, chlorine, $CH_3$ or $NO_2$ and Y is $AsO_3H_2$, $PO_3H_2$, $SO_3H$ or OH, the said amine being used in an amount above 2 to 5 times the stoichiometric amount and the solution at (A) being precooled to between −3° and 0° C. and the solution at (B) being precooled to between −5° and 0° C.

9. A method as defined in claim 8, wherein the base used in the solution of said substituted chromotropic acid diamide is a 20–50% by volume aqueous solution of pyridine.

10. A method as defined in claim 8, wherein said chromotropic acid diamide is chromotropic acid dianilide and said diazotized primary amine is diazotized aniline-o-arsonic acid.

11. A method as defined in claim 8, wherein said chromotropic acid diamide is chromotropic acid dianilide and said diazotized primary amine is diazotized 2-amino-5-chlorophosphoric acid.

12. A method as defined in claim 8, wherein said chromotropic acid diamide is chromotropic acid dianilide and said diazotized primary amine is diazotized p-toluidine-m-sulfonic acid.

13. A method as defined in claim 8, wherein said chromotropic acid diamide is chromotropic acid dianilide and said diazotized primary amine is diazotized o-hydroxy-p-nitroaniline.

14. A method as defined in claim 8, wherein said chromotropic acid diamide is chromotropic acid dioctadecyldiamide and said diazotized primary amine is diazotized aniline-o-arsonic acid.

15. A method as defined in claim 8, wherein said chromotropic acid diamide is unsubstituted chromotropic acid diamide and said diazotized primary amine is diazotized aniline-o-arsonic acid.

References Cited

Kuznetsov et al., C. A., vol. 51, pp. 8708–8709 (1957).

FLOYD D. HIGEL, Primary Examiner

U.S. Cl. X.R.

260—556, 443, 502.5